July 25, 1961    O. R. CARPENTER ET AL    2,993,983
METHOD OF AND APPARATUS FOR PANEL WALL WELDING
WITH PLURAL PAIRS OF ELECTRODES
Filed March 3, 1959      8 Sheets-Sheet 1

INVENTORS
Otis R. Carpenter
Frank W. Armstrong
BY
ATTORNEY

July 25, 1961    O. R. CARPENTER ET AL    2,993,983
METHOD OF AND APPARATUS FOR PANEL WALL WELDING
WITH PLURAL PAIRS OF ELECTRODES
Filed March 3, 1959    8 Sheets-Sheet 2

INVENTORS
Otis R. Carpenter
Frank W. Armstrong
BY
ATTORNEY

INVENTORS
Otis R. Carpenter
BY Frank W. Armstrong

ATTORNEY

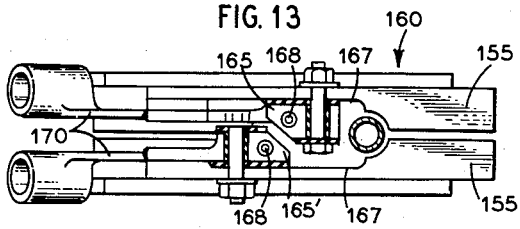
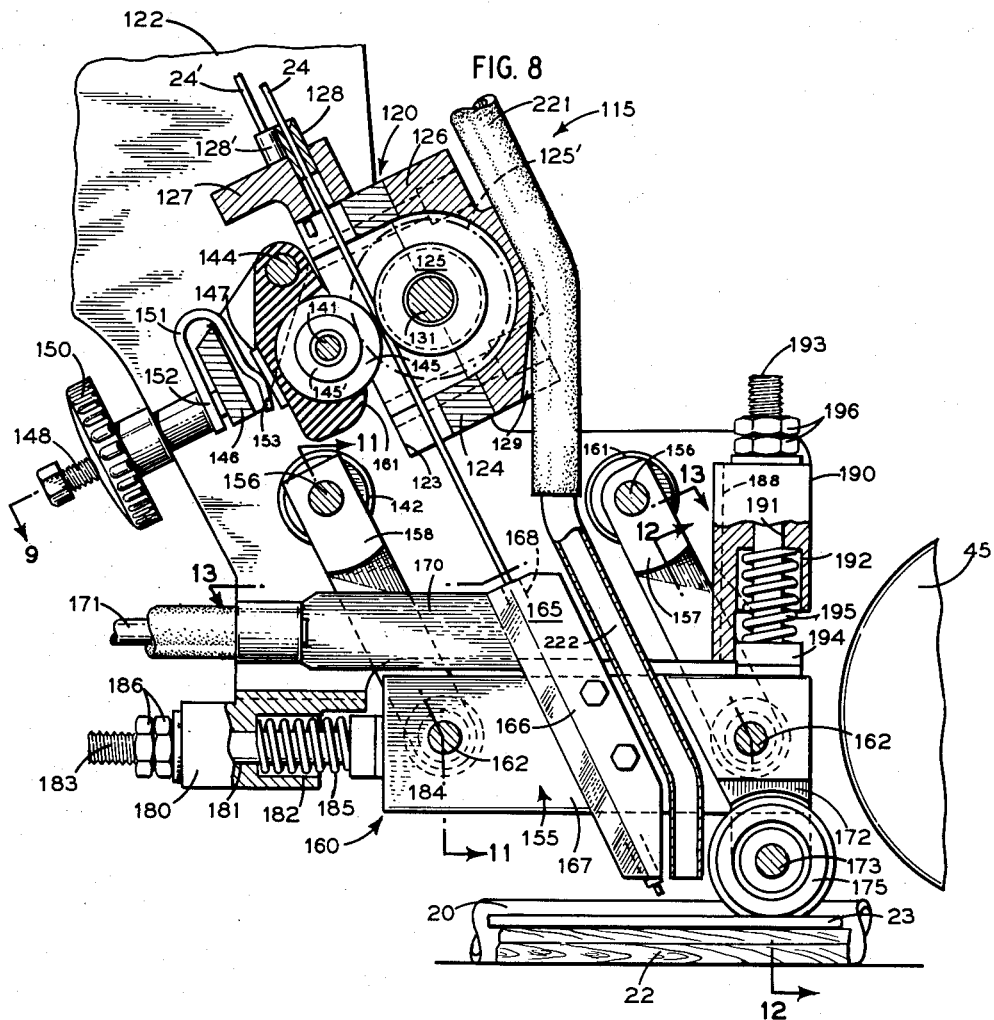

INVENTORS
Otis R. Carpenter
BY Frank W. Armstrong

ATTORNEY

July 25, 1961 O. R. CARPENTER ET AL 2,993,983
METHOD OF AND APPARATUS FOR PANEL WALL WELDING
WITH PLURAL PAIRS OF ELECTRODES
Filed March 3, 1959 8 Sheets-Sheet 6

INVENTORS
Otis R. Carpenter
BY Frank W. Armstrong

ATTORNEY

July 25, 1961

O. R. CARPENTER ET AL 2,993,983
METHOD OF AND APPARATUS FOR PANEL WALL WELDING
WITH PLURAL PAIRS OF ELECTRODES

Filed March 3, 1959 8 Sheets-Sheet 7

INVENTORS
Otis R. Carpenter
BY Frank W. Armstrong

ATTORNEY

July 25, 1961 O. R. CARPENTER ET AL 2,993,983
METHOD OF AND APPARATUS FOR PANEL WALL WELDING
WITH PLURAL PAIRS OF ELECTRODES
Filed March 3, 1959 8 Sheets-Sheet 8

INVENTORS
Otis R. Carpenter
Frank W. Armstrong
BY
ATTORNEY

United States Patent Office

2,993,983
Patented July 25, 1961

2,993,983
METHOD OF AND APPARATUS FOR PANEL WALL WELDING WITH PLURAL PAIRS OF ELECTRODES
Otis R. Carpenter and Frank W. Armstrong, Barberton, Ohio, assignors to The Babcock & Wilcox Company, New York, N.Y., a corporation of New Jersey
Filed Mar. 3, 1959, Ser. No. 796,898
23 Claims. (Cl. 219—124)

This invention relates to integrated multiple tube heat exchanger panels and, more particularly, to a novel method of and apparatus for fabricating such panels by electric arc fusion welding adjacent tubes to interposed metal web forming means in such a manner that a number of tubes sufficient to form a "beam," of a depth capable of resisting heat induced distortion parallel to the plane of the panel, is weld united into an integral sub-unit before any such heat induced distortion forces are effective.

In the construction and erection of modern vapor generators and other forms of heat exchangers, there is a pronounced trend toward the use of pre-fabricated integral tube panels. As these panels are fabricated in the shop, shipped to the erection site as a unit, and erected as a unit, there is a very considerable saving in fabrication and erection costs as compared to the known practice of shipping individual tubes to the erection site and then assembling these tubes into a tube wall.

Panel walls of this type comprise a plurality of laterally spaced, parallel and relatively elongated metal tubes united into an integral assembly by relatively elongated metal ligaments or webs interposed between adjacent tubes and fused thereto. Before assembly into panels, the tubes may be deformed to provide any required openings in the panels, such as for burners, soot blowers, access openings, etc.

An advantage of shop fabrication of the panels is that the welded joints can be made by the usual automatic or semi-automatic welding equipment and with the tubes in the best position for satisfactory welding. Additionally, the welds can be more readily inspected and correction of defects is facilitated. Readily available shop equipment may be used for inspection, stress-relieving, and other necessary operations. All this is in contrast to the difficulties and expense involved in field welding, inspection, defect correction, stress-relieving, and assembling of tubes into walls.

However, there are some problems incidental to weld uniting the tubes into an integral panel. The principal problem is that of heat induced distortion tending to warp or bend the tubes and thus distort the panel. Prevention or control of such distortion requires special provisions as to tube clamping and welding sequences which seriously increase the cost of production operation. These problems, which are more pronounced with the electric arc fusion welding techniques generally used for panel fabrication, have to some extent mitigated the advantages of shop fabrication.

In the copending application of F. W. Armstrong, Serial No. 701,809, filed December 10, 1957, now Patent No. 2,911,517 issued Nov. 3, 1959, there is described and claimed an electric arc fusion welding system by means of which a pair of closely adjacent parallel and elongated welding seams may be formed simultaneously without the usual problems of magnetic blow and variable ground current path encountered when welding with two closely adjacent arcs. This welding system is used in the panel welding procedure described and claimed in the copending application of O. R. Carpenter and F. W. Armstrong, Serial No. 739,293, filed June 2, 1958, in which the opposite edges of relatively elongated metal webs each disposed between a pair of tubes are simultaneously electric arc fusion welded to the adjacent tubes. In this procedure, there is substantially no heat-induced distortion in a plane parallel to the panel in thus integrating the first pair of tubes, due to the fact that both tubes of the first pair are simultaneously welded to their interposed web or spacer strip. This holds true for only the first pair of tubes thus integrated with an interposed web by two simultaneously formed fusion welded seams with substantially equal heat inputs during welding, as the heat-induced distortion forces in the two tubes substantially counteract each other.

However, to complete a multiple tube panel, it is necessary to add tubes to the first pair of tubes, this being effected, for example, by placing a third tube adjacent one of the first pair of tubes, with an interposed spacer strip, and then simultaneously joining this spacer strip to such one tube of the first pair and to such third tube. In this operation, there is one tube on one side of the welding zone and two tubes on the other side. Consequently, the masses of metal adjacent the two simultaneously formed fusion welds are unequal by a large amount, and there is accordingly a relatively large unbalance in the heat-induced distortion forces acting on each side of the newly added spacer strip, with resultant distortion in one lateral direction parallel to the panel.

This distortion can be mitigated or corrected, at least to some extent by adding tubes and strips alternately to opposite sides of the panel, and by restraining the distortion by the conjoint use of tube positioning jigs and relatively powerful clamping means. After a sufficient number of tubes and strips are incorporated into the panel, the panel assumes the characteristics of a structural beam having a web of sufficient depth, relative to its length, to resist deflection forces parallel to the web. As a consequence, any distortion in the panel parallel to the plane thereof, if not corrected before the number of tubes and strips incorporated into the panel is sufficient to provide full resistance to further distortion, cannot be corrected by counter forces applied parallel to the panel.

In accordance with the present invention, advantage is taken of this beam web "stiffness" factor by arranging a plurality of tubes with interposed webs, sufficient in number to provide, when integrated by welding, a "beam depth" of a value effective to resist deflection. The edges of all the strips are then fusion welded simultaneously to the adjacent tubes, using the aforementioned twin electrode welding system. Thus, in a single welding pass, a panel sub-section, having a width sufficient to provide the web stiffness necessary to resist deflection parallel to the plane of the panel, is formed. Consequently, as other tubes and strips or other panel sub-sections are added to the first sub-section to complete the panel, there is no heat-induced distortion parallel to the plane of the panel.

An alternative procedure, particularly adaptable to panels formed of relatively smaller diameter tubes, is to arrange a plurality of tubes with interposed webs, sufficient to provide, when integrated by welding, a "beam depth" of a value effective to resist deflection. The edges of alternate strips are then fusion welded simultaneously to the adjacent tubes, using the aforementioned twin electrode welding system, to form a plurality of pairs of tubes each welded to an interposed web or strip. Then the edges of the intermediate strips (those between the alternate strips) are fusion welded simultaneously to their adjacent tubes to unite the tube pairs into a panel sub-section having a "web" thickness sufficient to resist heat induced distortion parallel to the plane of the panel.

The apparatus for performing the invention method comprises a welding head including electrode feeding means for six electrodes driven by a common drive. The six electrodes are arranged in three pairs, with each pair so disposed as to weld the seams between the edges of one spacer strip and the pair of tubes adjacent thereto. Each pair of electrodes is connected to two sources of direct current, one of the electrodes being connected in straight polarity (electrode negative) and the other electrode in reverse polarity (electrode positive), with the opposite terminals of the two sources being commonly connected to the work. The electrical connections, as far as each pair of electrodes is concerned, are the same as shown and described in said copending application Serial No. 701,809, now Patent No. 2,911,517, issued Nov. 3, 1959. Also, as described in said copending application Serial No. 701,809, now Patent No. 2,911,517, issued Nov. 3, 1959 the straight polarity electrode is fed at a rate of the order of 40 percent faster than the reverse polarity electrode, and the reverse polarity electrode leads the straight polarity electrode by a slight amount along the work to be welded.

The welding head feeding the six electrodes, together with associated reels for the electrodes, controls, and power supply connections is mounted on a trolley movable along a bridge extending across the support fixture for the tubes and strips. A fluid pressure energized actuator on the trolley is arranged to press roller means downwardly against the tubes being welded, in advance of the electrodes, to hold these tubes firmly against a support fixture or bed, and to hold the tubes in properly spaced relation for the welding operation.

The welding head includes guide rolls in advance of the electrode which engage the metal webs or spacer strip and press the same firmly against baked and charred wood support strips having a conforming fit between adjacent tubes. These wood support strips accommodate shrinkage of the welds by absorbing the stresses due to movement of the adjacent tubes toward each other, so that the tubes do not ride up the support strips as would be the case if metal support strips were used. The pressure of the guide rolls against the metal webs or ligaments is only a minor fraction of the pressure of the roller means against the tubes. For example, the pressure against the tubes may be 10,000 p.s.i. and that against the webs 100 p.s.i.

The wood support strips have a cross-sectional shape generally resembling an isoceles trapezoid having a rectangle coextensively superpoesd on its upper base, although the sides of the strip may be concave. The lateral dimension of the rectangle is substantially equal to that of the metal web or ligament. The wood support strip is baked, to eliminate sap and moisture, and has a surface char. A preferred wood is oak.

The metal webs or spaced strips between adjacent tubes preferably have the cross-sectional area of a flattened octagon. This particular section facilitates alignment of the webs and maintaining the webs straight. In addition, the contour of the webs is particularly suitable for formation of good fillet welds between the strips and tubes, with burning through of the web edges for thorough penetration.

A further feature of the welding head is the combining of the electrode feeding rollers, guiding rolls, and electrode spacing means in a single unit which is readily detachable from the balance of the welding head so that the unit may be readily interchanged with other units to provide for welding tubes of different sizes and spacings. Alternatively, the support members may be made of metal, such as aluminum, or of ceramic, or other material which will not evolve gas when heated during the welding operation.

For an understanding of the invention principles, reference is made to the following description of typical embodiments thereof as illustrated in the accompanying drawings. In the drawings:

FIG. 8 is a vertical sectional view illustrating the spacer strip pressing means, flux depositing means, and electrode feeding and contact means on the movable sub unit;

FIG. 13 is a plan view of the guide shoe and bus bar assembly, corresponding substantially to the line 13—13 of FIG. 8;

Figure 1:
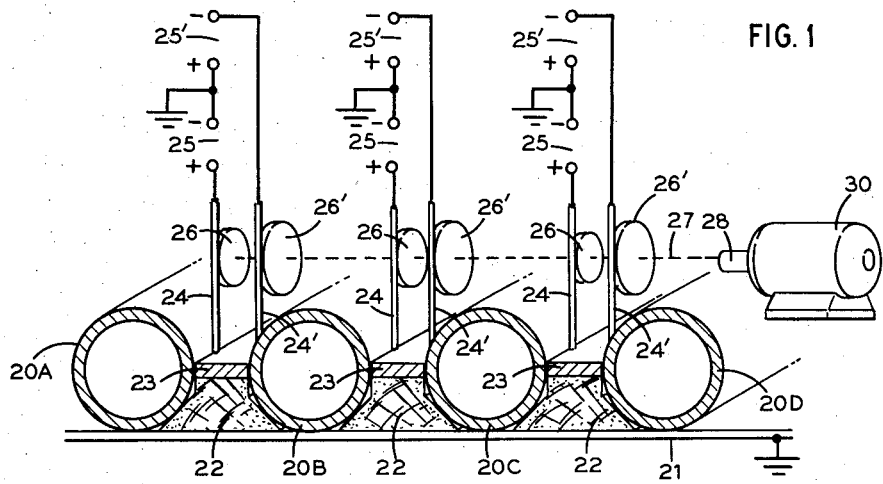
FIG. 1 is a somewhat schematic partial end elevation view of the apparatus combined with a schematic wiring diagram of the welding circuits, and illustrating the application of the invention to the formation of a tube panel composed of relatively large diameter tubes.

Referring to FIG. 1, in practicing the method of the invention as applied to forming a panel of relatively larger diameter tubes, a plurality of such tubes 20 are arranged in predetermined laterally spaced parallel relation on a suitable metal jig or other metal support 21. In the specific example, using a welding head conjointly feeding three pairs of electrodes to the work, four tubes, 20A through 20D, are positioned on support 21, providing three inter-tube spaces.

Each inter-tube space has positioned therein, on jig or support 21, a spacer web support strip 22 described more fully hereinafter, these strips 22 supporting metal webs, spacer strips, or ligaments 23 at predetermined heights relative to tubes 20. The spacer strips 23 are shown, solely in agreement with the somewhat schematic nature of FIGS. 1, 2 and 3, as rectangular in cross-section. However, and as described more fully hereinafter, the elements 23, uniting tubes 20 into a panel structure when edge fusion welded to adjacent tubes, preferably have a cross-section other than rectangular.

In accordance with the invention, the opposite longitudinal edges of three metal spacer strips or webs, such as 23, are conjointly and simultaneously fusion weld united to the pair of tubes between which the respective strip or web is interposed. In the 4-tube, 3-web arrangement of FIG. 1, each strip 23 has a pair of electrodes 24, 24' operatively arranged therewith to fusion weld both side edges of the strip simultaneously to the adjacent tubes 20. Two independent sources of D.C. potential are provided for each pair of electrodes, as indicated at 25, 25'.

Electrode 24 of each pair is connected to the positive terminal of its individual D.C. source 25, and electrode 24' of each pair is connected to the negative terminal of its individual source 25'. The negative terminal of each source 25 is connected to the positive terminal of the associated source 25', and these connections are grounded so that they are effectively connected to grounded jig or support 21. Electrodes 24 are thus connected in reverse polarity relative to the work and electrodes 24' are connected in straight polarity relative to the work.

All three pairs of electrodes are conjointly fed to the work, as indicated schematically by feed rolls 26, 26' fixed to a common drive shaft 27 connected, either directly or through reduction gearing, to the output shaft 28 of a drive motor 30. As illustrated, the diameter of rolls 26' is substantially 40% greater than that of rolls 26, so that the feeding speed of electrodes 24' is 140% of that of electrodes 24. As pointed out in said copending application Serial No. 701,809, this results in reduction of the ground current to zero. Also, and as pointed out in said copending application Serial No. 701,809, now Patent No. 2,911,517, issued Nov. 3, 1959, the reverse polarity electrodes 24 lead the straight polarity electrodes 24', along the work, by a small amount, the concomitant preheating of the work by the reverse polarity electrodes resulting in more efficient operation of the straight polarity electrodes.

With the arrangement described operating in the manner described, the four relatively large diameter metal tubes 20A–20D are simultaneously fusion weld united to the three interposed metal spacer strips or webs 23. Thus, in a single welding pass in which there is no unbalanced heating of the work, a panel structure is formed which has sufficient "beam" strength, in direction parallel to its general plane, to resist any lateral distortion stresses resulting from the welding heat input accompanying the fusion weld uniting of additional tubes to the initial structure to complete the panel.

Figure 2:
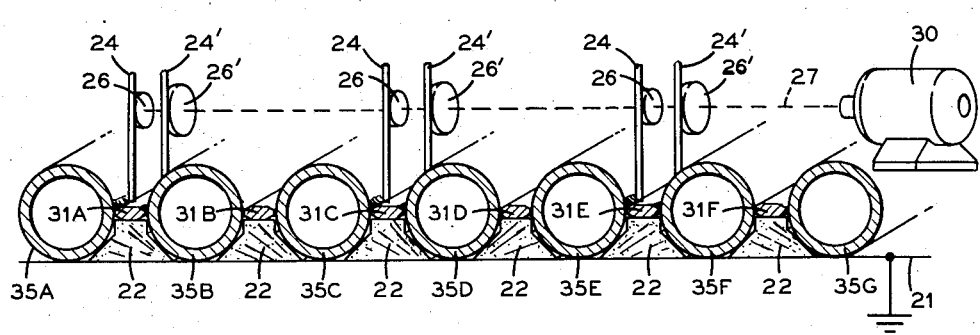
FIGS. 2 and 3 are similar views illustrating the application of the invention to the formation of a tube panel composed of relatively small diameter tubes.
Figure 3:
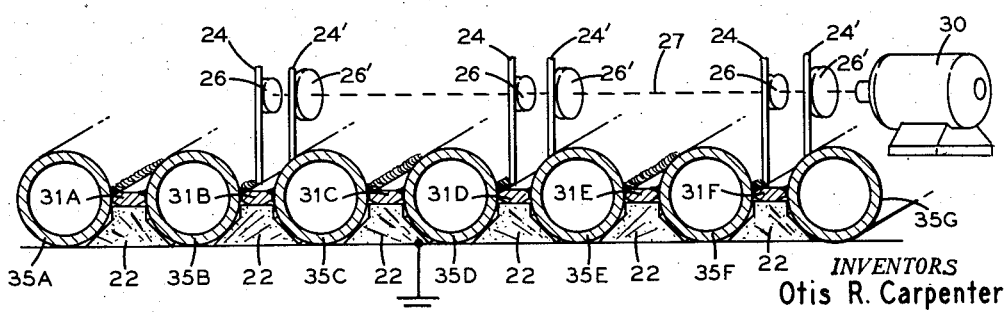

FIGS. 2 and 3 are somewhat schematic representations illustrating the two steps of the invention method as applied to the welding of relatively small diameter metal tubes 35 to form a panel sub-component. The apparatus and circuit connections used are identical with those used in FIG. 1.

Referring to FIGS. 2 and 3, seven tubes 35A to 35G are arranged in laterally spaced, parallel relation on support or jig 21, and web support strips 22 are placed in each of the inter-tube spaces. Six metal webs or spacer strips 31A to 31F are placed between the tubes, one in each of the six inter-tube spaces.

As shown in FIG. 2, the conjointly fed three pairs of electrodes 24, 24' are initially positioned with one pair of electrodes operatively arranged with each alternate spacer strip or web 31A, 31C and 31E and, in a single welding pass, these three webs are fusion weld united to their associated pairs of tubes 35A and 35B, 35C and 35D, and 35E and 35F. This first weld pass thus provides three pairs of tubes with the tubes of each pair fusion weld united to a spacer strip interposed therebetween.

For the second step, the welding head is shifted laterally to the position of FIG. 3 wherein each pair of welding electrodes 24, 24' is arranged in operative relation to an intermediate spacer strip 31B, 31D, and 31F. In a second single welding pass, these intermediate spacer strips have both their longitudinal edges simultaneously fusion weld united to the tubes adjacent thereto thus uniting the three pairs of joined tubes, plus tube 35G, into a unitary panel component comprising seven tubes joined by six spacer strips, thus providing a component having a "beam" strength sufficient to withstand any distortion forces acting parallel to its general plane.

It will be noted that, in the embodiment of FIG. 1, the invention involves the weld uniting, in a single pass, of four relatively large diameter tubes with three interposed webs into a panel structure of sufficient depth to resist distortion forces acting parallel to its general plane. On the other hand, and as shown in the embodiment of FIG. 2, a much larger number of relatively smaller diameter tubes, with interposed spacer strips or webs, are required to achieve the same "web" depth. For practical reasons, in the latter case, there is a preliminary step of first forming a number of integrated pairs of tubes substantially equal to the number of relatively large diameter tubes in the first case, and then, in a single pass, welding these pairs and an additional tube to interposed spacer strips.

In both instances, the step of forming the panel component is the same. That is, this step involves, in a single welding pass, uniting into an integral structure a sufficient number of tubular components, with interposed spacer strips or webs, to provide a structure having sufficient beam strength to resist deflection or distortion forces acting parallel to the general plane of the structure. Hence, the term "tubular component" as used hereinafter is intended to mean either single tubes or pairs of tubes integrally united by a spacer strip or web.

Figure 4:
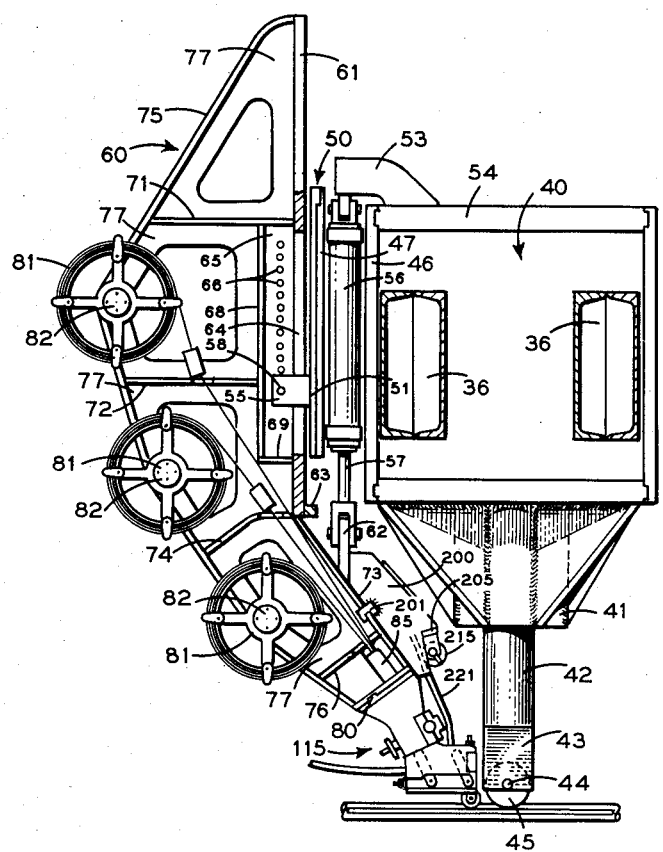
FIG. 4 is a side elevation view of welding apparatus embodying the invention.
Figure 5:
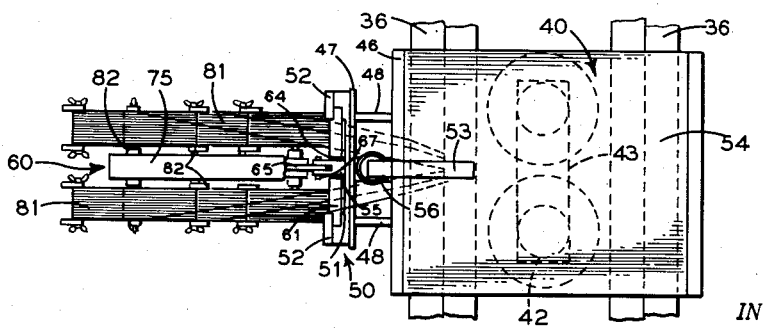
FIG. 5 is a plan view of the apparatus.

Referring to FIGS. 4 and 5, the welding apparatus embodying the invention is mounted, for vertical adjustment, on a trolley 40 movable laterally of a crane bridge comprising beams 36 extending over a jig or other support surface between carriages (not shown) operating on rails extending along each side of the jig 21. Trolley 40 has depending therefrom a pair of laterally braced fluid pressure actuators each comprising a cylinder 41 and a piston 42, and a tube pressing unit is interchangeably secured to the lower ends of pistons 42. This unit comprises a relatively heavy inverted U-shape bracket 43 carrying a shaft 44 on which are a plurality of pressure rolls 45 having concave peripheries for engaging tubes 20 or 35. Actuators 41—42 are adapted to apply a holding force of 10,000 p.s.i. to the tubes through rolls 45.

The welding apparatus is mounted on a slide 60 arranged for vertical adjustment on trolley 40. For this purpose one side wall 46 of the trolley has secured thereon a box shape structure comprising a plate 47, parallel to wall 46 and connected thereto by side plates 48. A channel shape slide guide 50 has its web 51 secured to plate 47 and mounts slide 60 which has a vertical wall 61 bearing against laterally spaced surfaces of web 51. Gibs 52 secured to the flanges of guide 50 overlap the outer surface of wall 61, suitable bearing strips (not shown) being secured to guide 50 and interposed between the guide and slide wall 61. For a purpose to be described, a fork 55 projects outwardly from web 51 nearer to the lower end of guide 50.

A bracket 53 is mounted on the upper wall 54 of trolley 40 and projects toward guide 50. This bracket pivotally suspends the cylinder 56 of a fluid pressure actuator having a piston 57 pivotally connected to a lug 62 on slide 60. Actuator 56—57 effects vertical adjustment of slide 60 in guide 50.

Slide 60 is a generally upright structure including wall 61 which has a lug 63 on its lower end engageable with guide 50 to limit upward movement of the slide. A web 65 extends along the outer surface of wall 61 and is normal thereto. Wall 61 has a slot 64 aligned with web 65, slot 64 being shorter and substantially wider than the web. Fork 55 of guide 50 projects through slot 64 and embraces web 65. Web 65 has a vertical extending series of holes 66 respectively registerable with a hole 58 in fork 55 to receive suitable pin means 67 locking slide 60 in vertically adjusted position.

Rib 65 is braced by flange strips 68 and 69, as well as by horizontal flange 71. A second horizontal flange 72 extends outwardy from strip 68, a flange 73 extends downwardly and inwardly in continuation of wall 61, and flanges 74 and 76 extend laterally from flange 73. An outside edge flange interconnects the outer ends of wall 61 and flanges 71, 72, 74 and 76, both flange 73 and flange 75 extending downwardly beyond flange 76. Apertured reinforcing webs 77 fill the spaces defined by the several flanges and the portions of wall 61 beyond web 65. The lower end of slide 60 is "closed" by a relatively heavy plate 80 forming the support surface for interchangeably mounting different welding "heads" on slide 60.

Figure 6:
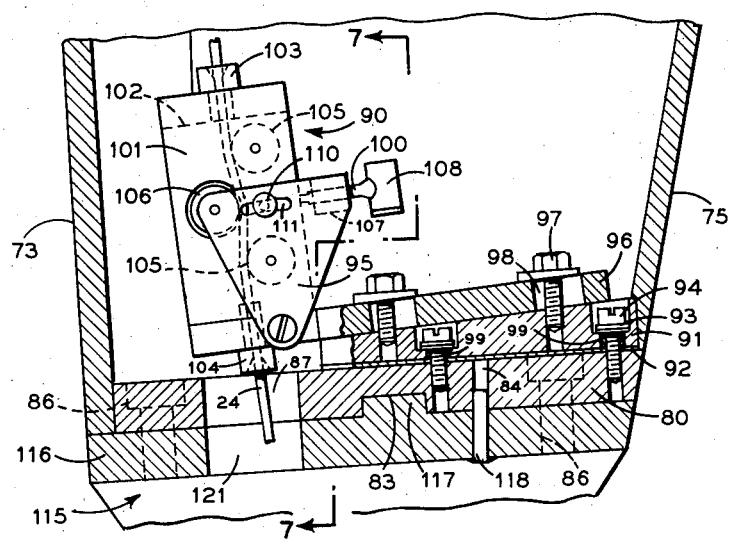
FIG. 6 is a vertical sectional view through the lower end of a mounting slide shown in FIG. 4, and illustrates the wire or electrode straightening means.
Figure 7:
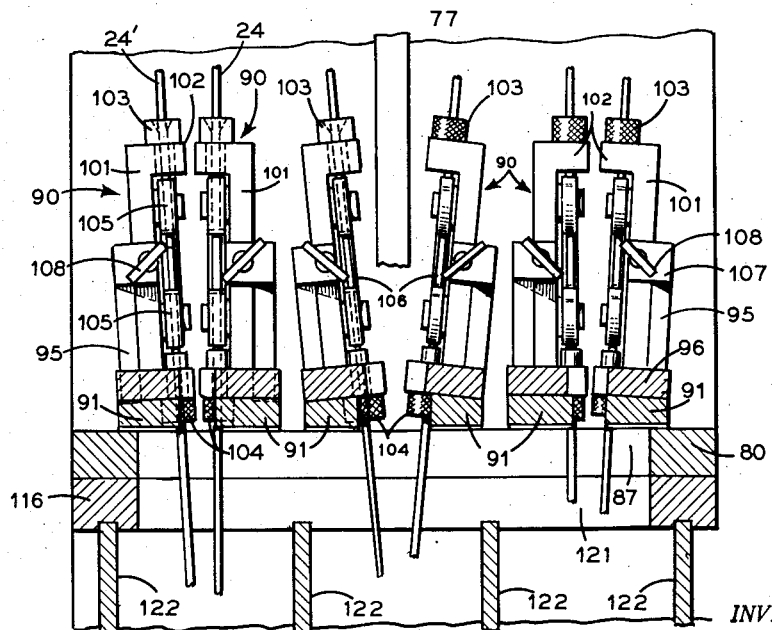
FIG. 7 is a sectional view on the line 7—7 of FIG. 6.

Slide 60 supports the six reels 81 for the six welding electrodes and wires, and also the six wire straightening mechanisms generally indicated at 85 and shown more particularly in FIGS. 6 and 7. Reels 81 are rotatably and replaceably mounted on hubs or stub shafts 82 on webs 77 adjacent flange 75, the reels being arranged in three pairs with the reels of each pair on opposite sides of webs 77.

There are six wire straightening mechanisms 85, one associated with each reel 81. Each of these mechanisms may be mounted on a flange 72, 74, or plate 80, adjacent its associated reel, as shown in FIG. 4. Alternatively, all six mechanisms may be mounted on plate 80, three on each side of web 77, as shown in FIGS. 6 and 7. The top wall 116 of the interchangeable welding head 115 is disengageably secured to plate 80, being accurately located thereon by a rib 117 fitting a groove 83 in the lower face of plate 80 and dowel pins 118 engageable in holes 84 therein. Head 115 is secured to plate 80 by bolts 86. Plate 80 is formed with a transversely elongated aperture 87 registering with an aperture 121 in wall 116, and, irrespective of the location of straightening mechanisms 85, electrode wires 24, 24' extend through apertures 87, 121 to the electrode feeding rolls, current conducting means, and guiding means.

Referring to FIGS. 6 and 7, each straightening mechanism includes a wedge shaped plate 91 secured in electrically isolated relation to plate 80 through the medium of a dielectric shim or spacer 92 and dielectric washers 93 and sleeves 99 beneath the head of bolts 94 securing plate 91 to plate 80 and seating in counter-sunk recesses in plate 91. A roller support bracket 90 includes an elongated lower leg 96 secured to plate 91 by bolts 97 in slotted holes 98 in leg 96, the slotted holes allowing adjustment of bracket 90 along plate 91.

Bracket 90 includes a vertical leg 101 integral with leg 96 and having a horizontal leg 102 integral therewith at its upper edge. A guide bushing 103 is mounted through leg 102 in axial alignment with a guide bushing 104 mounted through leg 96. These bushings guide electrodes 24, 24' through the straightening mechanism.

A substantially triangular plate 95 is oscillatably mounted on the outer surface of leg 101 and has an integral tubular boss at its upper lefthand corner (FIG. 6) projecting through an aperture in leg 101 and rotatably mounting an anti-friction straightening roller assembly 106. The upper right-hand corner of plate 95 has an integral lug 107 through which is threaded a screw 100 having an operating head 108. The end of screw 100 bears aganist the edge of leg 101 to adjust roller assembly 106 relative to a cooperating pair of roller assemblies 105, 105 mounted on leg 101, the electrode wires 24, 24' being threaded between roller 106 and rollers 105. The degree of straightening is determined by screw 100 which controls the position of roller 106 relative to rollers 105. When plate 95 is properly adjusted, it is locked in position by a stud 110 extending through an arcuate slot 111 in plate 95 and threaded into leg 101. It will be noted that a pair of mating brackets 90 with plates 95, of opposite hand, are provided for each pair of electrode wires 24, 24'.

Welding head 115 is mounted in a housing which includes wall 116 and four partitions 122 set into equispaced parallel grooves in wall 116 and welded thereto. Partitions 122 are also interconnected by tie bars and brackets as described more fully hereinafter.

Figure 9:
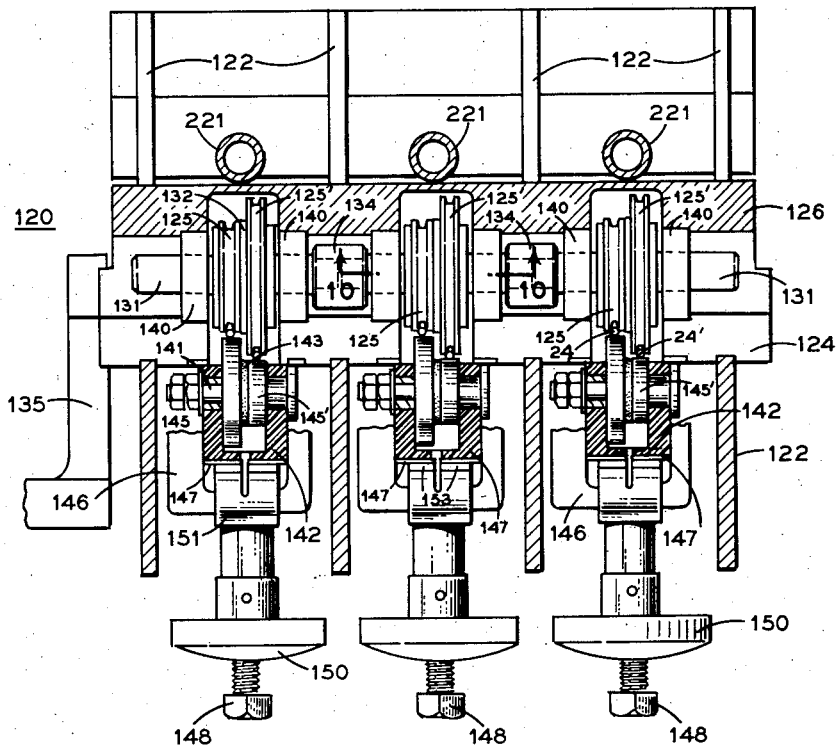
FIG. 9 is a sectional view of the common drive means for the electrodes, taken on the line 9—9 of FIG. 8.
Figure 10:
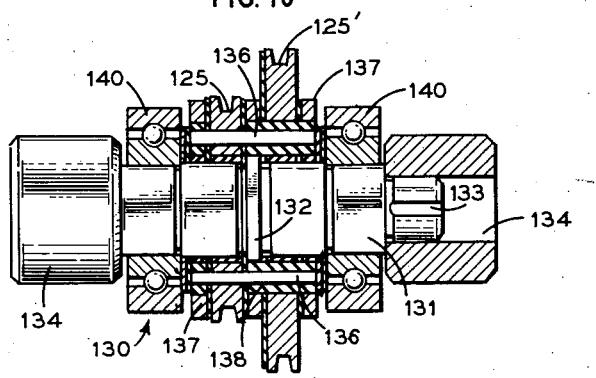
FIG. 10 is a sectional view on the line 10—10 of FIG. 9.
Figure 11:
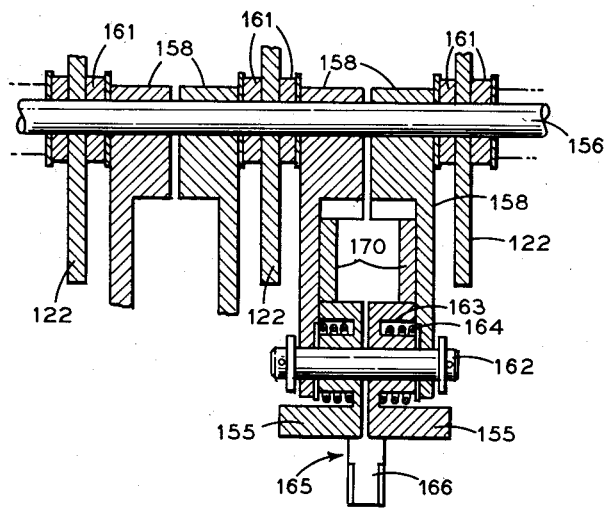
FIGS. 11 and 12 are sectional views on the correspondingly numbered lines of FIG. 8.

The six electrode wires 24, 24' are drawn from the reels 81 through the straightening mechanisms 85 by the common drive means 120 shown more particularly in FIGS. 8, 9 and 10. Drive means 120 includes mating brackets 124, 126 rotatably mounting grooved drive rolls 125, 125' arranged in electrically insulated pairs. Bracket 124 has four equispaced parallel grooves receiving partitions 122, and has three angular lugs 127 welded to its upper edge and each apertured to receive a pair of dielectric guide bushings 128, 128' for the electrode wires. Mating bracket 126 is bolted to bracket 124 and has three equispaced relatively wide grooves 129 for a purpose to be described.

There are three coupled driving assemblies 130 mounted in the brackets 124, 126. As best seen in FIGS. 9 and 10, each assembly includes a steel drive shaft 131 having an integral collar 132 midway of its length and keyways 133 at each end. The three drive shafts are coupled for conjoint rotation by coupling sleeves 134 receiving keys in the keyways 133. A coupling 134 on the outer end of either end shaft 131 couples the jointed shafts to the output shaft of a drive motor (not shown) mounted on a bracket 135 which can be secured to either end of bracket 124.

Metal feed rollers 125, 125' are mounted on shaft 131 on either side of flange or collar 132, being insulated from shaft 131 by dielectric bushings and from collar 132 by dielectric washers. The rollers are coupled to be driven by shaft 131 through the medium of pins 136 extending through aligned apertures in rollers 125, 125', collar 132, and metal washers 137 insulated from the rollers by dielectric washers and from pins 136 by dielectric bushings, one set of dielectric bushings 138 also insulating roller 125' from pins 136 and thus from roller 125. Dielectric washers are placed against the outer surfaces of metal washers 137, overlying the ends of pins 136, and are separated by brass washers from antifriction bearings 140 which rotatably support shafts 131 in brackets 124, 126.

Electrode wires 24, 24' are maintained in firm driving engagement with the respective drive rollers 125, 125' by pressure rollers 145, 145' arranged in three pairs, each pressure roller being aligned with a drive roller. The two pressure rollers of each pair are rotatably mounted on a shaft 141 in a dielectric support 142, a dielectric washer 143 being interposed between rollers 145 and 145'. Support 142 is swingable on a shaft 144 in a U-shape bracket 146 secured to bracket 124, and a pair of laterally spaced wear plates 147 are secured on the outer surface of support 142.

A bolt 148 is non-rotatably secured to project from the outer wall of bracket 146 and has threaded thereon a palm grip nut 150 whose inner end engages the outer end 152 of a bowed spring 151 apertured to fit over bolt 148. Spring 151 extends over the outer wall of bracket 146 and has split and bent inner ends 153 each engaging a wear plate 147. Adjustment of nuts 150 along bolts 148 varies the pressure of springs 151 on supports 142, and thus controls the pressure exerted by rollers 145, 145' on electrodes 24, 24' to maintain the latter firmly engaged with drive rollers 125, 125'.

Referring to FIGS. 8, 11, 12 and 13, each of the three guide shoe and bus bar assemblies, generally indicated at 160, includes a pair of mating guide shoes 155 essentially angular in cross-section. Each pair of shoes is suspended from shafts 156 extending through partitions 122, by means of front and rear pairs of links 157, 158 swingable on shafts 156, the links being separated from partitions 122 by spacers 161. A shaft 162 in the lower end of each pair of links connects the links to the guide shoes, shafts 162 extending coaxially through annular spring recesses 163 on the outer surfaces of shoes 155, recesses 163 seating coil springs 164 bearing against the links and forcing them slightly apart laterally.

Each guide shoe 155 has secured thereto, in electrically insulated relation, a contact member 165 or 165' for conducting current to the respective electrode wires 24 or 24'. Each contact member includes a relatively elongated substantially flat section 166 extending forwardly and downwardly through a recess 167 in the inner surface of a shoe 155, and having a bore 168 extending longitudinally therethrough for the electrode wire. A cable terminal lug 170 is secured to the upper end of section 166 and extends rearwardly substantially horizontally for reception of a conductor of cable 171 connected to the welding current power supply 25, or 25'.

The forward ends of shoes 155 have ears 172 projecting downwardly therefrom to receive shafts 173 rotatably mounting pairs of guide rolls 175 pressing metal webs 23 against support strips 22. Shafts 173 are held against rotation and axial movement in ears 172 by lock plates 176 engaging flattened ends or chordal surfaces on the shafts. Rolls 175 are rotatable on bushings 177 on the shafts 173, roll 175' being axially slidable on its bushing. The rolls are biased axially apart by coil springs 178 seated in facing recesses in the rolls, roll 175' having a hub extending into the recess of roll 175 and serving to center the spring 178. A pair of pins 179 lock each set of rolls 175, 175' for unitary rotation, pins 179 extending through apertures in a sponge rubber washer 187 seated in facing annular recesses in the rolls. As described more fully hereinafter, the rolls have differing external peripheries and outer surface configurations dependent on the size tubes being integrated into a panel and on the position of the membranes 23 relative to the common axial or diametric plane of the tubes.

A tie bar 180 extends across the housing rearwardly of the guiding mechanisms 160, and has four grooves in its upper surface seating partitions 122. Tie bar 180 has three horizontal passages 181 opening forwardly into enlarged recesses 182 coaxial therewith. Each passage 181 receives a bolt 183 having a T head 184 carrying a wear plate engaging the ends of a pair of guide shoes 155. A coil spring 185 is seated in each recess 182 and bears against the head 184 of the bolt 183 embraced by the coil spring. These springs, together with nuts 186 threaded on bolts 183, maintain the pre-set relative longitudinal positions of the guide mechanisms.

As stated heretofore, guide rolls 175 exert a pressure of approximately 100 p.s.i. on webs 23 against support strips 22. For this purpose, a tie bar 190, essentially similar to tie bar 180, is seated in recesses 188 in the forward edges of partitions 122 and has four spaced parallel grooves seating the partitions. Bar 190 has three vertical passages 191 therethrough, opening downwardly into enlarged recesses 192 each coaxial with a passage. Passages 191 receive bolts 193 having T heads 194 carrying wear plates engaging the forward upper edges of guide shoes 155. Coil springs 195 embrace bolts 173 and are seated in recesses 192 and engage the bolt heads 194. Adjustment of nuts 196 on bolts 193 limits the downward movement of the guiding mechanisms 160.

Figure 14:
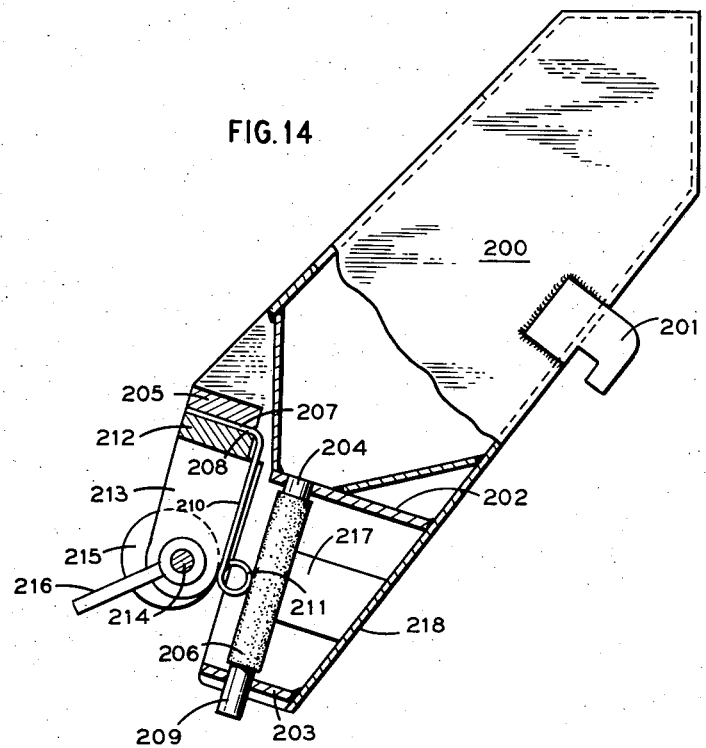
FIG. 14 is a part elevation and part sectional view of a flux hopper and its associated flow control valves.

The welding method and apparatus are particularly useful in submerged arc welding. Referring to FIGS. 4 and 14, a common flux hopper 200 is provided with hooks 201 engageable in openings in plate 73 of slide 70 and hooking over the edges of the openings. The side and inner walls of the hopper extend beyond bottom wall 202 and are interconnected by a wall 203, thus providing an outwardly opening housing below wall 202. Three metal nipples 204 in wall 202 are respectively axially aligned with three metal nipples 209 through wall 203, and three flexible tubes 206 interconnect the upper and lower nipples. A tie bar 205 is welded across the side walls above wall 202, and has three transverse grooves 207 in its lower surface. Each groove receives the bent upper end 208 of a flat spring 210 having an eye 211 at its lower end, each eye 211 engaging a tube 206.

Ends 208 are clamped in the grooves 207 by a bar 212 bolted to bar 205 and having welded thereto three forks 213. Each fork is apertured to receive a shaft or pin 214 rotatably supporting an eccentric 215 having an operating handle 216. Eccentrics 215 bear against the lower ends of springs 210 and are operated by handles 216 to selectively control flow of flux through tubes 206 by varying the pressure of spring eyes 211 thereagainst, the tubes being compressed against blocks 217 secured to inner wall 218 in alignment with each tube 206.

Flexible tubes 221 connect the lower ends of nipples 209 to offset metal tubes 222 extending between each pair of guide shoes 155 and secured to one guide shoe by suitable bracket means (not shown). The discharge ends of tubes 222 terminate between guide rolls 175 and the lower ends of contact shoes 165.

Figure 12:
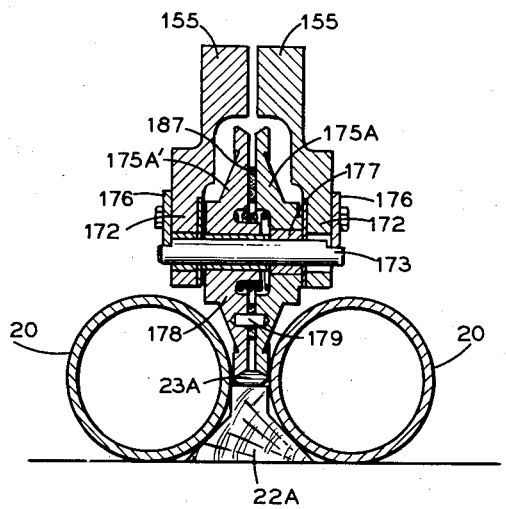

In the guide roll arrangement shown in FIG. 12, the web or membrane 23A is positioned in the common diametric or axial plane of tubes 20, being supported on support strip or spacing and positioning device 22A.

Figure 19:
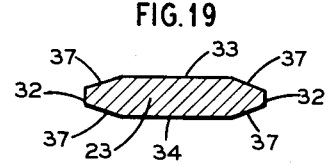
FIG. 19 is an end elevation view illustrating the cross-sectional shape of the metal membranes or spacer strips.

Referring to FIG. 19, the preferred cross-sectional shape of all the membranes 23 is that of a flattened octagon having relatively short vertical edges 32 contiguous to the tubes 20, the other edges or faces of the octagon being approximately equal. Membrane 23 has horizontal and substantially parallel upper and lower surfaces 33, 34, the lower surface serving as a base engaging device or strip 22. Bevelled or sloping surfaces 37 connect surfaces 32 to surfaces 33, 34, the upwardly facing surfaces 37 cooperating with the tubes to form "welding grooves." It will be noted that the membranes 23 are symmetrical and thus may be used as shown or inverted.

The breadth and thickness of membrane 23 is selected in accordance with the desired inter-tube spacing with relation to the tube size and wall thickness, and the desired membrane thickness, which is likewise correlated with the tube parameters. In the particular example shown in FIG. 12, the panel to be formed comprises 2½" diameter tubes on 3" centers. For this arrangement, membrane 23A has a width of 0.530" and a thickness of 9/16", with edges 32 being 1/32" wide and faces 37 having an included angle of 60 degrees.

Membranes 23A, in this instance, are supported on strip or positioning devices 22A of kiln dried white oak which may be surface charred to assure removal of all moisture and sap. As stated, strips 22A have the cross-sectional shape of an isosceles trapezoid with a rectangle coextensively superposed on its upper base. In the illustrated example, strip 22A has a height of 1.166", a lower base width of 1.876", and an upper base width of 0.528". The trapezoid sides slope at 45 degrees and the height of the rectangle is 0.489". Alternatively, strip 22A could be an aluminum strip of substantially the same cross-sectional shape as the kiln dried and surface charred wood strip.

The arrangement of FIG. 12 is used with the panel forming technique of FIG. 1, in which three membranes 23 and four tubes 20 are united into a panel sub-section in a single welding pass, this technique being possible due to the center-to-center spacing of tubes 20 being in excess of the overall width of the membrane pressure roll assembly. Rolls 175A, 175A' have bevelled peripheries engaging the upper bevelled surfaces 37 of membrane 23A, the outer surfaces of the rolls, adjacent their peripheries, lying in diametric planes and being contiguous to tubes 20 adjacent the roll peripheries. Frusto-conical intermediate surface portions join these outer surface portions to the hubs of the rolls, and have clearances with tubes 20.

It will be noted that the sides of the isosceles trapezoidal portion of strip 22A engage the surfaces of tubes 20, thus centering the strip between the tubes in advance of the welding operation. As the welds cool, the fused weld metal shrinks so that the center-to-center spacing of tubes 20 decreases. If strips 22 were hard metal, the tubes would tend to ride up the sloping sides of strips 22. However, in the case of both the wood strip and the aluminum strip, there is sufficient "give" in the strip to allow slight lateral compression thereof. This characteristic of the strip, supplemented by the pressure roll hold down of the tubes and membranes, prevents such riding up of the tubes and maintains them in the flat plane of the panel.

Figure 15:
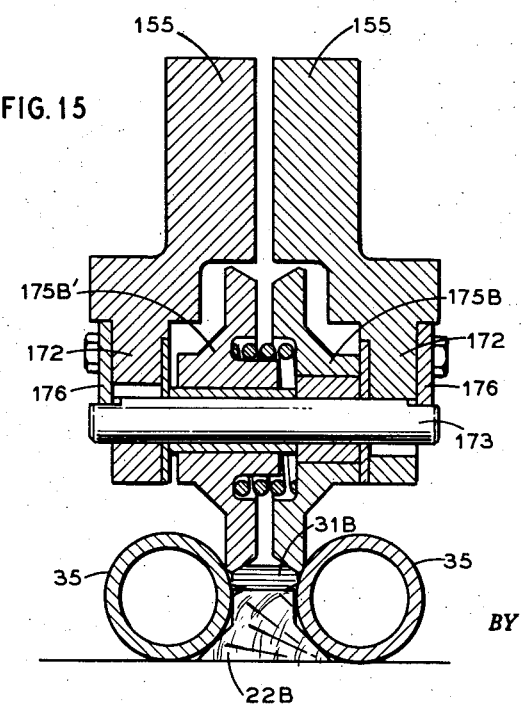
FIGS. 15 and 17 are vertical sectional views illustrating the apparatus as used in forming panels of various sizes of tubes and with varying placements of the metal webs.

The arrangement shown in FIG. 15 is designed for the welding of 1" diameter tubes 35 on 1½" centers with membranes 31B spaced above or rearwardly of the common diametric or axial plane of the tubes. The welding is effected by the procedure of FIGS. 2 and 3 wherein the two tubes of each of three pairs are welded to an interposed membrane in a single pass and then, in a second single pass, the three pairs of tubes plus an additional tube are welded into an integral panel sub-section.

In this arrangement, membrane 31B, while essentially similar in shape to membrane 23A, has a width of 0.535", a depth of 9/16", and 1/32" wide edges 32B, with surfaces 37B having an included angle of 60 degrees. Support strip 22B has a height of 0.546", a lower base width of 1.140", and a "rectangle" width (upper base) of 0.515". This drip is kiln dried white oak preferably surface charred.

It will be noted that, in this case, the tubes 35 contact the sides of the rectangle rather than the sides of the isosceles trapezoid.

Figure 16:
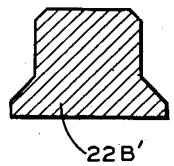
FIG. 16 is an end elevation view of an alternative form of a support strip useable in the arrangement of FIG. 15.

Alternatively, the aluminum support device or strip 22B' of FIG. 16 may be used, this strip differing from strip 22B substantially only in the provision of bevelled upper corners and truncated lower corners. Also, in this arrangement, the rolls 175B, 175B' have longer outer surfaces lying in diametric planes, as compared to those of the rolls 175A, 175A' of FIG. 12.

Figure 17:
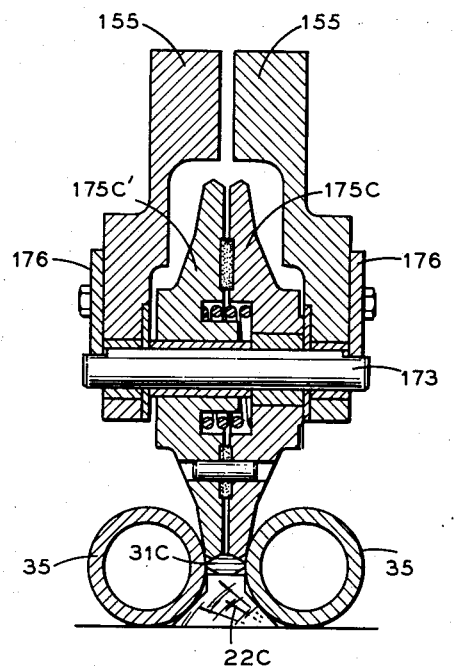

FIG. 17 illustrates the formation of a panel of 1 1/8" diameter tubes on 1 1/2" centers with membranes 31C in the common diametric or axial plane of the tubes, using the procedure of FIGS. 2 and 3. In this case, membrane 31c has a width of 0.380", and a thickness of 9/16". Edges 32C are 1/32" wide and the included angle of surfaces 37C is 60 degrees. The kiln dried white oak support strip is 0.468" high and has an upper base width of 0.395", the tubes 35 contacting the vertical sides of the rectangle. The outer faces of rolls 175C, 175C' are essentially concave.

Figure 18:
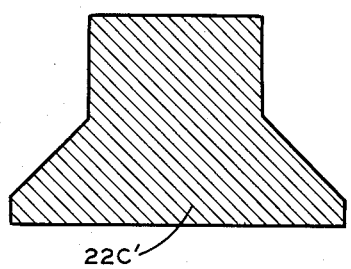
FIG. 18 is an end elevation view of an alternative form of support strip useable in the arrangement of FIG. 17.

Alternatively, the aluminum strip of FIG. 18 may be used, this strip 22C' having truncated vertical lower edges but corresponding otherwise to strip 22C.

From the foregoing description, it will be clear that the outstanding feature of the invention apparatus is the provision of the six electrodes, arranged in three pairs and driven by a common drive means. With the separate power source for each electrode, and the described electrical connections, it is possible to form six seams simultaneously, thus providing, in a single welding pass, for the joining into an integral unit of a sufficient member of tubular components to provide a structure having sufficient beam strength to resist distortion forces in a plane parallel to the general plane of the panel. Auxiliary features contributing to this result are the hold down pressure rolls 45 for the tubes and the pressure rolls 175 for the membranes, plus the novel compressible support strips 22 for the membranes.

A further advantageous feature is the easy interchangeability of the welding heads 115 by removing bolts 86. Thereby, the apparatus is quickly and easily adapted for a variety of tube sizes and spacings, and positioning of the membranes. When all the welds on one face of the panel have been completed, the panel is inverted and the welds are formed on the opposite face of the panel.

While specific embodiments of the invention have been shown and described in detail to illustrate the application of the invention principles, it will be understood that the invention may be embodied otherwise without departing from such principles.

What is claimed is:

1. The method of forming an integrated multiple tube panel composed of substantially parallel spaced metal tubes integrally united by metal webs interposed between the tubes, said method comprising the steps of arranging in laterally spaced substantially parallel relation a plurality of relatively elongated metal tubular components sufficient in number that, when united into an integral structure by welding to relatively elongated metal web members disposed between each pair of components, the lateral extent of the structure will provide sufficient beam strength to resist welding heat induced distorting stresses in the general plane of the structure; disposing a relatively elongated metal web member between each pair of tubular components; and, in a single welding pass, simultaneously weld uniting all of the web members to the tubular components on both sides thereof to form a panel unit comprising a plurality of tubular components integrally connected by interposed metal web members.

2. The method of forming an integrated multiple tube panel composed of substantially parallel spaced metal tubes integrally united by metal webs interposed between the tubes, said method comprising the steps of arranging in laterally spaced substantially parallel relation a plurality of relatively elongated metal tubular components sufficient in number that, when united into an integral structure by welding to relatively elongated metal web members disposed between each pair of components, the lateral extent of the structure will provide sufficient beam strength to resist welding heat induced distorting stresses in the general plane of the structure; disposing a relatively elongated metal web member between each pair of tubular components; and, in a single welding pass, simultaneously forming pairs of fusion welds uniting both edges of all the web members to the adjacent tubular components to form a panel unit comprising a plurality of tubular components integrally connected by interposed metal web members.

3. The method of forming an integrated multiple tube panel composed of substantially parallel spaced metal tubes integrally united by metal webs interposed between the tubes, said method comprising the steps of arranging in laterally spaced substantially parallel relation four relatively elongated metal tubular components; disposing a relatively elongated metal web member between each pair of tubular components; and, in a single welding pass, simultaneously weld uniting the three web members to the tubular components on both sides thereof to form a panel unit comprising four tubular components integrally connected by three interposed metal web members.

4. The method of forming an integrated multiple tube panel composed of substantially parallel spaced metal tubes integrally united by metal webs interposed between the tubes, said method comprising the steps of arranging in laterally spaced substantially parallel relation four relatively elongated metal tubular components; disposing a relatively elongated metal web member between each pair of tubular components; and, in a single welding pass, simultaneously forming three pairs of fusion welds uniting both edges of the three web members to the adjacent tubular components to form a panel unit comprising four tubular components integrally connected by three interposed metal web members.

5. The method of forming an integrated multiple tube panel composed of substantially parallel spaced metal tubes integrally united by metal webs interposed between the tubes, said method comprising the steps of arranging four relatively elongated metal tubes in substantially parallel laterally spaced relation; disposing three relatively elongated metal web members each between a pair of tubes; and, in a single welding pass, simultaneously weld uniting the three web members to the tubes on both sides thereof to form a panel unit comprising four tubes integrally connected by three interposed metal web members.

6. The method of forming an integrated multiple tube panel composed of substantially parallel spaced metal tubes integrally united by metal webs interposed between the tubes, said method comprising the steps of arranging four relatively elongated metal tubes in substantially parallel laterally spaced relation; disposing three relatively elongated metal web members each between a pair of tubes; and, in a single welding pass, simultaneously forming three pairs of fusion welds uniting both edges of the three web members to the adjacent tubes to form a panel unit comprising four tubes integrally connected by three interposed metal web members.

7. The method of forming an integrated multiple tube panel composed of substantially parallel spaced metal tubes integrally united by metal webs interposed between the tubes, said method comprising the steps of arranging seven relatively elongated metal tubes in substantially parallel laterally spaced relation; disposing six relatively elongated metal web members each between a pair of tubes; in a single welding pass, simultaneously weld uniting the three alternate web members to the tubes on both sides thereof; and, in a second welding pass, simultaneously weld uniting the three intermediate web members to the tubes on both sides thereof to form a panel unit comprising seven tubes integrally connected by six interposed web members.

8. The method of forming an integrated multiple tube panel composed of substantially parallel spaced metal tubes integrally united by metal webs interposed between the tubes, said method comprising the steps of arranging seven relatively elongated metal tubes in substantially parallel laterally spaced relation; disposing six relatively elongated metal web members each between a pair of tubes; in a single welding pass, simultaneously forming three pairs of fusion welds uniting both edges of the three alternate web members to the adjacent tubes; and, in a second welding pass, simultaneously forming three pairs of fusion welds uniting both edges of the three intermediate web members to the adjacent tubes to form a panel unit comprising seven tubes integrally connected by six interposed web members.

9. Electric welding apparatus comprising, in combination, a welding head including a plurality of welding electrode driving rollers arranged in coaxial electrically isolated relation and coupled for conjoint rotation; common driving means for said rollers; a plurality of welding electrode supply means equal in number to said driving rollers and each associated with one of said driving rollers; pressure means operable to maintain each electrode in driving engagement with its associated driving roller; a plurality of current conducting elements on said welding head each in electric current conducting relation with one of the electrodes; and welding current supply means in electrical connection with said elements.

10. Electric welding apparatus comprising, in combination, a welding head including a plurality of pairs of welding electrode driving rollers arranged in coaxial electrically isolated relation and coupled for conjoint rotation; common driving means for said rollers; a plurality of welding electrode supply means equal in number to said driving rollers and each associated with one of said driving rollers; pressure means operable to maintain each electrode in driving engagement with its associated driving roller; a plurality of current conducting elements on said welding head each in electric current conducting relation with one of the electrodes; and welding current supply means in electrical connection with said elements.

11. Electric welding apparatus comprising, in combination, a plurality of pairs of welding electrode driving rollers arranged in coaxial electrically isolated relation and coupled for conjoint rotation; common driving means for said rollers; a plurality of welding electrode supply means equal in number to said driving rollers and each associated with one of said driving rollers; pressure means operable to maintain each electrode in driving engagement with its associated driving roller; a plurality of current conducting elements equal in number to said driving rollers and each in electric current conducting relation with one of the electrodes; and individual direct current sources each connected to one of said conducting elements and commonly connected to the work.

12. Electric welding apparatus comprising, in combination, a plurality of pairs of welding electrode driving rollers arranged in coaxial electrically isolated relation and coupled for conjoint rotation; common driving means for said rollers; a plurality of welding electrode supply means equal in number to said driving rollers and each associated with one of said driving rollers; pressure means operable to maintain each electrode in driving engagement with its associated driving roller; a plurality of current conducting elements equal in number to said driving rollers and each in electric current conducting relation with one of the electrodes; and individual direct current sources each connected to one of said conducting elements and commonly connected to the work; one electrode of each pair being connected to the positive terminal of its individual source and the other electrode of each pair being connected to the negative terminal of its individual source.

13. Electric welding apparatus comprising, in combination, a support structure; a welding head interchangeably mounted on said support structure and including a plurality of pairs of welding electrode driving rollers arranged in coaxial electrically isolated relation and coupled for conjoint rotation, and common driving means for said rollers; a plurality of welding electrode supply reels, equal in number to said driving rollers, mounted on said support structure and each feeding an electrode to one of said driving rollers; pressure means on said welding head operable to maintain each electrode in driving engagement with its associated driving roller; a plurality of current conducting elements on said welding head each in electric current conducting relation with one of the electrodes; and individual direct current sources each connected to one of said conducting elements and commonly connected to the work.

14. Electric welding apparatus for simultaneously fusion weld uniting into an integrated multiple tube panel section a plurality of relatively elongated metal tubular components, arranged in laterally spaced substantially parallel relation with relatively elongated metal web members disposed each between a pair of components, and sufficient in number that, when fusion weld united to the interposed web members to form such panel section, the lateral extent of the section will provide sufficient beam strength to resist distortion stresses in the general plane of the panel during fusion weld uniting of additional tubular components and web members to the panel section; said apparatus comprising, in combination, a bed for supporting the tubular components in laterally spaced relation; relatively elongated spacing and positioning devices for the web members extending along the bed between and in laterally spaced contiguous relation with adjacent tubular components, the devices having coplanar upper surfaces supporting the web members; a carriage movable along said bed above the tubular components thereon; hold down roll means extending downwardly from said carriage and having a lateral extent sufficient to simultaneously engage such number of tubular components; pressure means operable to force said hold down roll means against such number of tubular components on said bed with a first pre-determined pressure; a support structure mounted on the trailing side of said carriage; a welding head interchangeably mounted on said support structure and including a plurality of pairs of welding electrode driving rollers arranged in coaxial electrically isolated relation and coupled for conjoint rotation, the number of such pairs equalling the number of web members disposed between adjacent components of such number of components, and common driving means for said rollers; a plurality of welding electrode supply reels, equal in number to said driving rollers, mounted on said support structure and each feeding an electrode to one of said driving rollers; pressure means on said welding head operable to maintain each electrode in driving engagement with its associated driving roller; a plurality of current conducting elements on said welding head equal in number to said driving rollers and each in electric current conducting relation with one of the electrodes, and each guiding its associated electrode toward the juncture of a tubular component and a web member; second hold down roll means, equal in number to such number of web members, movably mounted on said welding head; and means biasing each second hold down roll means into engagement with the associated web member to exert thereon a second predetermined pressure.

15. Electric welding apparatus as claimed in claim 14 in which said devices have the general cross-sectional shape of an isosceles trapezoid with a rectangle on its upper base.

16. Electric welding apparatus as claimed in claim 14 in which said devices are formed of a relatively rigid but somewhat compressible material to compensate for decreases in the spaces between tubular components upon shrinkage of the weld deposits upon solidification.

17. Electric welding apparatus as claimed in claim 14 in which said devices are kiln dried wood preferably with a surface char.

18. Electric welding apparatus as claimed in claim 14 in which said devices are aluminum.

19. Electric welding apparatus as claimed in claim 14 in which there are three pairs of electrode driving rollers.

20. Electric welding apparatus as claimed in claim 14 in which said support structure is mounted for vertical movement on said carriage; and actuating means on said carriage connected to said support structure to move the same vertically.

21. The method of forming an integrated multiple tube panel composed of substantially parallel spaced metal tubes integrally united by metal webs interposed between the tubes, said method comprising the steps of arranging at least five relatively elongated metal tubes in substantially parallel laterally spaced relation; disposing four relatively elongated metal web members each between a pair of tubes; in a single welding pass, simultaneously weld uniting the two alternate web members to the tubes on both sides thereof; and, in a second welding pass, simultaneously weld uniting the remaining web members to the tubes on both sides thereof to form a panel unit comprising five tubes integrally connected by four interposed web members.

22. Electric welding apparatus for weld uniting into an integrated multiple tube panel section a plurality of relatively elongated metal tubes arranged in laterally spaced substantially parallel relation with a metal web member disposed between said tubes, said apparatus comprising, in combination, a bed for supporting the tubes in laterally spaced relation, a relatively elongated spacing and positioning device supporting the web member and extending along the bed between and in contiguous relation with adjacent tubes, hold down roll means having a lateral extent sufficient to simultaneously engage such number of tubes, pressure means operable to force said hold down roll means against such number of tubes on said bed, second hold down roll means engaging said web member and operable to force said web member against said device, and means for simultaneously weld uniting both edges of the web member to the adjacent tubes to form a panel unit.

23. Electric welding apparatus for weld uniting into an integrated multiple tube panel section a plurality of relatively elongated metal tubes arranged in laterally spaced substantially parallel relation with a metal web member disposed between said tubes, said apparatus comprising, in combination, a bed for supporting the tubes in laterally spaced relation, a relatively elongated spacing and positioning device supporting the web member and extending along the bed between and in contiguous relation with adjacent tubes, a carriage movable along said bed above the tubes thereon, hold down roll means extending downwardly from said carriage and having a lateral extent sufficient to simultaneously engage such number of tubes, pressure means operable to force said hold down roll means against such number of tubes on said bed, a support structure mounted on the trailing side of said carriage, a welding head mounted on said support structure, and second hold down roll means mounted on said welding head and engaging said web member and operable to force said web member against said device, said welding head including means for simultaneously weld uniting both edges of the web member to the adjacent tubes to form a panel unit.

References Cited in the file of this patent

UNITED STATES PATENTS 2,658,162    Tichenor et al.  ----------  Nov. 3, 1953